US006332090B1

(12) United States Patent
DeFrank et al.

(10) Patent No.: US 6,332,090 B1
(45) Date of Patent: *Dec. 18, 2001

(54) THERMALLY ISOLATED PROBE FOR BIOMEDICAL APPARATUS AND METHOD OF COMMUNICATING ENERGY THERE THROUGH

(75) Inventors: Michael P. DeFrank, Temecula; Robert J. Rosati, Carlsbad, both of CA (US)

(73) Assignee: Alaris Medical Systems, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/458,010

(22) Filed: Jun. 1, 1995

Related U.S. Application Data

(63) Continuation of application No. 08/110,491, filed on Aug. 23, 1993, now abandoned, which is a continuation of application No. 07/710,385, filed on Jun. 5, 1991, now abandoned, which is a continuation of application No. 07/490,336, filed on Mar. 8, 1990, now abandoned.

(51) Int. Cl.[7] ............................. A61B 6/00; A61B 5/00; G01K 1/08; G01J 5/00
(52) U.S. Cl. ................. 600/474; 600/549; 374/126; 374/130; 374/131; 374/135; 374/158; 374/208; 374/209
(58) Field of Search ............................ 128/633, 634, 128/664, 736; 604/31; 374/130–133, 126, 33, 135, 188, 208, 209; 600/474, 549

(56) References Cited

U.S. PATENT DOCUMENTS

| 2,661,454 | 12/1953 | Wannamaker, Jr. et al. | ......... 323/66 |
|---|---|---|---|
| 2,696,117 | 12/1954 | Harrison | ................................. 73/355 |
| 3,277,715 | 10/1966 | Vanderschmidt | ........................ 73/355 |

(List continued on next page.)

FOREIGN PATENT DOCUMENTS

| 0 044 791 | 7/1981 | (EP) . | |
|---|---|---|---|
| 0 180 368 | 10/1985 | (EP) . | |
| 0 245 010 | 4/1987 | (EP) . | |
| 0 337 724 | 4/1989 | (EP) . | |
| 0292027 | * 11/1988 | (JP) | ..................................... 374/132 |
| 1103843 | * 7/1984 | (RU) | ..................................... 128/736 |
| 90/05902 | 5/1990 | (WO) . | |
| 90/06090 | 6/1990 | (WO) . | |

OTHER PUBLICATIONS

European Search Report for EP 91 10 3428.

*Primary Examiner*—Aaron J. Lewis
*Assistant Examiner*—K. M. Reichle
(74) *Attorney, Agent, or Firm*—Fulwider Patton Lee & Utecht, LLP

(57) ABSTRACT

The thermal isolation apparatus for the protruding probe of a biomedical thermometer includes an insulative air gap and a heat sink disposed between the surface of the probe and the optical path through the probe. The heat sink surrounds the optical path, such as a waveguide, and acts to evenly distribute any heat along the entire length of the waveguide to avoid temperature variations. Additionally, the heat sink has sufficient mass for high heat capacity and may slow the progress of any heat from reaching or leaving the waveguide until after the measurement by the biomedical instrument has been completed. Disposed over the heat sink is a boot which forms the closed air space between the heat sink and the outer probe surface. The air gap combined with the heat sink provide relative thermal isolation of the optical path through the probe and provide relative thermal isolation of the target anatomy from the temperature of the probe.

30 Claims, 1 Drawing Sheet

U.S. PATENT DOCUMENTS

| | | | |
|---|---|---|---|
| 3,282,106 | * 11/1966 | Barnes | 73/355 |
| 3,368,076 | 2/1968 | Clifford | 250/83.3 |
| 3,491,596 | * 1/1970 | Dean | 73/355 |
| 3,531,992 | * 10/1970 | Moore | 73/359 |
| 3,581,570 | * 6/1971 | Wortz | 73/355 R |
| 3,878,836 | 4/1975 | Twentier | 128/9 |
| 3,942,891 | 3/1976 | Speilberger et al. | 356/43 |
| 4,005,605 | 2/1977 | Michael | 73/355 |
| 4,301,682 | 11/1981 | Everest | 73/355 R |
| 4,380,998 | 4/1983 | Kieffer et al. | 128/9 |
| 4,527,896 | 7/1985 | Irani et al. | 356/43 |
| 4,602,642 | * 7/1986 | O'Hara et al. | 128/664 |
| 4,634,294 | 1/1987 | Christol | 374/126 |
| 4,636,091 | * 1/1987 | Pompei et al. | 374/124 |
| 4,662,360 | * 5/1987 | O'Hara et al. | 128/9 |
| 4,722,612 | 2/1988 | Junkert et al. | 374/124 |
| 4,784,149 | * 11/1988 | Berman et al. | 374/158 |
| 4,790,324 | * 12/1988 | O'Hara et al. | 128/736 |
| 4,797,840 | * 1/1989 | Fraden | 128/736 |
| 4,863,281 | * 9/1989 | Suszynski | 574/158 |
| 4,895,164 | * 1/1990 | Wood | 128/736 |
| 4,900,162 | * 2/1990 | Beckman et al. | 128/736 |
| 4,911,559 | * 3/1990 | Meyst et al. | 374/158 |
| 4,932,789 | * 6/1990 | Egawa et al. | 128/736 |
| 4,993,419 | * 2/1991 | Pompei et al. | 128/664 |
| 5,012,813 | * 5/1991 | Pompei et al. | 128/736 |
| 5,017,018 | * 5/1991 | Inchi et al. | 128/736 |
| 5,018,872 | * 5/1991 | Suszynski et al. | 374/207 |
| 5,024,533 | * 6/1991 | Egawa et al. | 128/756 |
| 5,066,142 | * 11/1991 | DeFrank et al. | 374/208 |
| 5,163,418 | * 11/1992 | Fraden et al. | 128/664 |
| 5,167,235 | * 12/1992 | Seucord et al. | 128/604 |
| 5,169,235 | * 12/1992 | Tominaga et al. | 128/664 |
| 5,179,936 | * 1/1993 | O Hara et al. | 128/664 |

* cited by examiner

THERMALLY ISOLATED PROBE FOR BIOMEDICAL APPARATUS AND METHOD OF COMMUNICATING ENERGY THERE THROUGH

This is a continuation of application Ser. No. 08/110,491, filed Aug. 23, 1993, now abandoned, that was a continuation of application Ser. No. 07/710,385, filed Jun. 5, 1991, now abandoned, that was a continuation of application Ser. No. 07/490,336, filed Mar. 8, 1990, now abandoned.

BACKGROUND OF THE INVENTION

1. Field of the Invention

This invention relates generally to a thermal isolation apparatus for biomedical instrumentation, and more particularly relates to thermally isolating a probe of a biomedical thermometer.

2. Description of Related Art

Medical thermometers are useful in the diagnosis of many diseases. Infrared (IR) biomedical thermometers have been adapted for measuring temperature from the auditory canal and the tympanic membrane. Such thermometers typically have an optical path, for example a waveguide, connecting the tip of the probe to a thermal detector located in the body of the thermometer. Temperature stability of this optical path is desirable so that it does not add unknown thermal components and adversely affect the temperature measurement of the patient. Contact of the probe with the ear of the patient may cause a cooling or heating of the ear canal depending upon the relative temperature of the probe, it may also cause heat of the patient to be conducted through the probe and to the waveguide which may result in "hot spots" or temperature variations in the waveguide, and an inaccurate temperature measurement of the patient may result. While it is desirable that physical contact of the probe with the patient not occur, such contact is inevitable. The length of such contact and the point or points of the probe contacting the patient vary with each user of the probe and with the physical configuration of each patient. While probe covers may be used over the thermometer probe to prevent contamination of the probe, these covers typically do not provide substantial thermal isolation by themselves and in fact may, if the probe cover is substantially hotter or colder than the probe or the ear canal, themselves undesirably affect the thermal performance of the probe and the temperature of the ear canal.

It would be desirable for an infrared biomedical probe to include an apparatus for thermally isolating the optical path of the probe from thermal energy which may be transferred to or from the probe by patient contact, by installing a new probe cover, and from other sources of heat or cold with which the probe may come into contact during use. The present invention addresses these needs.

SUMMARY OF THE INVENTION

Briefly, and in general terms, the invention provides an apparatus for thermally isolating the optical path through the probe of an infrared thermometer and for thermally isolating the exterior surface of the probe from the interior of the probe. A heat sink means is provided in thermal communication with the waveguide of the probe for minimizing the effects of extraneous thermal influences on the thermometer. The heat sink means is made of an excellent thermal conductor such as copper having a high thermal diffusivity and conductivity and has sufficient mass for high heat capacity.

The thermal isolation apparatus also comprises a closed air gap provided between the heat sink of the probe and the outer surface of the probe. In one embodiment, an outer boot forms the outer surface of the probe and has an inner contour generally conforming to the outer surface of the heat sink. The boot is spaced apart from the heat sink over the entire length of the waveguide in the probe and forms a thermal isolation air gap between the waveguide and the boot. The combination of the air insulation with the heat sink provides relative thermal isolation of the probe's optical path and provides relative thermal isolation of the exterior of the boot.

Other aspects and advantages of the invention will become apparent from the following detailed description, and the accompanying drawings, which illustrate by way of example the features of the invention.

DETAILED DESCRIPTION OF THE PREFERRED EMBODIMENT

As is shown in the exemplary drawings, the invention is embodied in a thermal isolation apparatus for a probe of a biomedical thermometer. The probe includes a waveguide which receives and channels electromagnetic energy, in this embodiment, infared radiation, to an infrared detector in the body of the thermometer. The thermal isolation apparatus isolates the waveguide and other optical path components from producing or receiving extraneous thermal influences which may arise during use.

Figure 1:
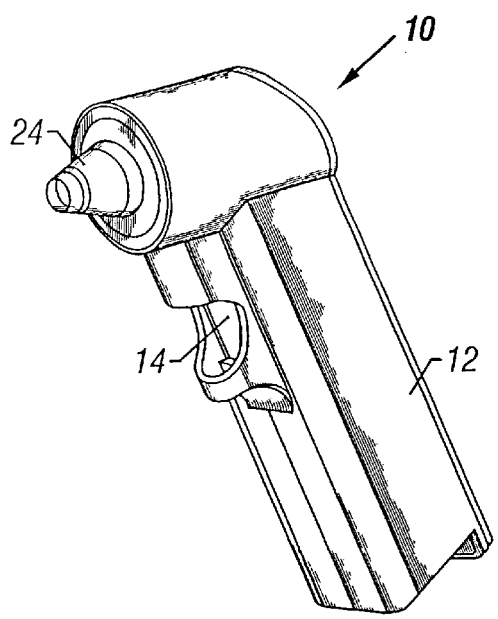
FIG. 1 is a front perspective view of a hand held biomedical thermometer which shows the protruding probe.
Figure 2:
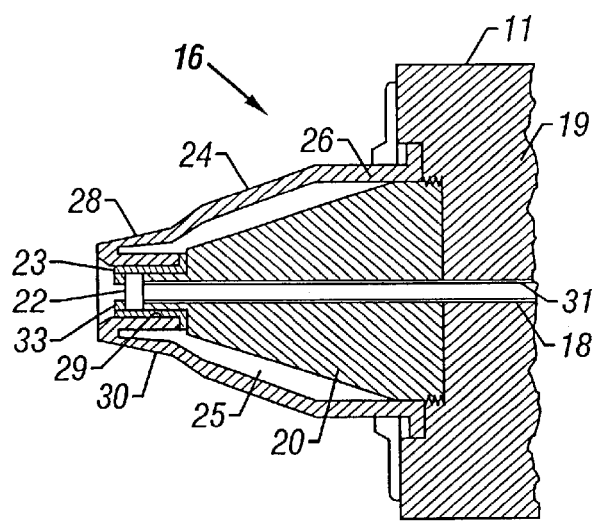
FIG. 2 is a partial sectional view through the axis of the probe of the thermometer shown in FIG. 1.

Referring now to FIGS. 1 and 2, a biomedical infrared thermometer 10 is shown for sensing the temperature of a patient. The body of the biomedical thermometer 11 houses an infrared radiation detector (not shown) and functional elements necessary for the detection of the temperature of the patient based upon the infrared radiation received by the thermometer from a body cavity such as the tympanic canal, or other portions of the patient's anatomy. The thermometer is preferably a hand held type including a handle 12, and an on-off trigger switch 14, so that the temperature readings may be quickly taken by the user by pointing the protruding probe 16 end at the target area of the patient from which a temperature reading is to be taken, such as the tympanic membrane.

The probe 16 includes a waveguide portion 18 providing an optical path for communicating electromagnetic energy received by the probe to the infrared detector which is preferably formed of a highly thermally conductive material such as copper, although it may be formed of other good heat conductive and reflective or platable material such as aluminum, brass, stainless steel, or the like. Surrounding the waveguide 18 is a heat sink 20. The heat sink may be integral with the waveguide 18 or may be a supporting structure within which the waveguide is mounted. Preferably, the waveguide is formed by forming a channel through the heat sink and plating 31 the channel with a substance which is highly reflective to infrared energy, such as gold. In another embodiment, the waveguide may be formed by inserting an intimately bonded sleeve of reflective material into the channel. The heat sink is in thermal communication with a heat sink 19 in the body 11 of the thermometer formed of a similar material. In the embodiment shown in FIG. 2, the waveguide is generally cylindrical in shape and extends axially through the heat sink 20 and has a first opening disposed at a distal end of the probe directed at the patient and a second opening at a proximal end facing the IR detector for communication of infrared energy from the temperature source to the infrared detector.

In another embodiment, the waveguide is frustro-conically shaped with the larger opening at the distal end of the probe for direction at the patient. The smaller opening was located facing to the IR detector in the body of the thermometer. This configuration resulted in more IR energy from the patient reaching the detector. In this embodiment, the waveguide opening at the distal end of the probe was selected to be a particular size based on the opening of the average ear. This size was larger than the size of the waveguide opening permitted by the particular detector used. Thus a frustro-conically shaped waveguide was used, although with other applications, a differently shaped waveguide may be more appropriate.

Figure 3:
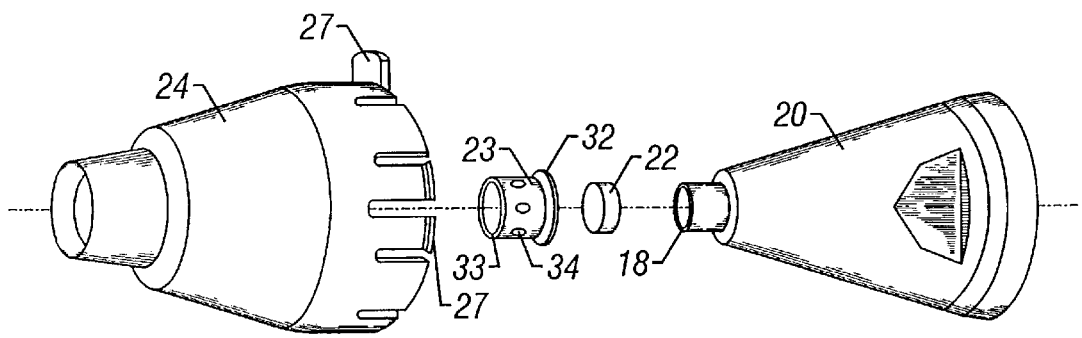
FIG. 3 is an exploded view of the thermal isolation boot and the heat sink containing the waveguide portion of the probe of FIG. 1.

Referring now to FIGS. 2 and 3, a window 22 is disposed at the end of the waveguide 18, and is mounted and protected in a sleeve 23 placed over the distal tip of the waveguide 18 and the window 22. The window 22 may be formed of a glass-like material such as zinc selenide which is substantially transparent to infrared energy. Alternatively, the window could be made of polyethylene or other similar materials that are also substantially transparent to infrared energy. In the embodiment disclosed, the zinc selenide window passes the infrared energy while sealing the end of the waveguide from contamination.

The sleeve 23 is preferably generally tubular and is made of a rugged material such as stainless steel to protect the window 22 and waveguide end. Additionally, the material is chosen to have a low thermal conductivity to provide additional insulation for these same two elements. In one embodiment, low thermal conductivity stainless steel was used. The sleeve 23 may also include a flange 32 at one end to fit snugly against a correspondingly inset portion of the heat sink 20. The sleeve 23 preferably includes a lip 33 around the inside of the end of the sleeve away from the flange end 32 for retention of the window 22 during assembly, and a series of holes 34 around the lip end of the sleeve through which adhesive may be applied to the edge of the window to permanently bond it in place in the sleeve 23. The window 22 and the sleeve 23 assembly can therefore be readily removed and replaced by sliding the sleeve 23 off the end of the waveguide 18.

The heat sink 20 shown in FIGS. 2 and 3, is generally conically shaped so that it will fit inside the outer boot 24 as is discussed below. The heat sink 20 is used to insulate the waveguide 18 from extraneous heat sources and to avoid the generation of "hot spots" or temperature variations along the waveguide. As used herein, hot spots are areas of significantly different temperature from the average temperature of the waveguide. When the probe is used to measure the temperature of a patient, it may come into contact with the patient at a point or points on the probe. It is desirable that the heat of the patient received by the probe due to contact at this point or points, not be conducted to the waveguide or if it is, at least be conducted evenly around the waveguide so that hot spots are not formed. In order to resist the formation of hot spots, the heat sink 20 is formed of a material having high thermal conductivity and diffusivity. By using such a material, the heat conducted to the heat sink at this point or points will be evenly distributed throughout the heat sink and along the waveguide. Additionally, the mass of the heat sink 20 is selected to have a high heat capacity. Depending on its size, the heat sink may present such a large heat capacity to the heat or cold source, that before any temperature change can reach the waveguide, which is located at the center of the heat sink, the temperature measurement of the patient will have been completed. In the embodiment shown in the FIGS., the heat sink 20 was formed of copper. In addition to having high thermal conductivity, high thermal diffusivity and sufficient mass for high heat capacity, it provides an excellent surface on which to plate highly thermally conductive materials, such as gold, to form the waveguide 18.

Another means of thermally isolating the probe includes forming a closed air space around the optical path. Mounted over the heat sink 20 of the probe is an outer boot 24 which contacts the heat sink 20 at the proximal base portion 26 of the boot, and contacts the sleeve 23 at the distal tip portion 28 of the boot. The outer boot may be approximately 2.54 mm (0.10 inch) thick and is preferably formed of a durable, hard plastic such as ABS, which is well known for its durability and thermal insulation properties and which can be plated with reflective materials. However, other materials may also be suitable. One or more tabs 27 are preferably provided for interfacing with corresponding slots (not shown) in the body 11 of the thermometer for securing the boot 24 to the thermometer. The inner surface of the boot between the proximal and distal areas of contact with the waveguide 18 is preferably spaced from the outer surface of the waveguide 18 by typically approximately 1.02 tmm (0.04 inches) although the spacing can vary, depending on the amount of air desired. A chamber forming a closed air space or air gap 25 is thereby formed between the boot and the waveguide, providing a layer of insulative air around the probe to further protect the waveguide channel from transient temperature changes due to patient contact or other extraneous thermal sources and protecting the target from temperature change due to contact with the probe.

The air gap preferably extends inside the boot 24 from the area where the proximal base portion 26 of the boot contacts the heat sink 20 to an area approximately where the distal tip portion 28 of the boot contacts the sleeve 23 over the distal tip of the probe. The distal tip 28 of the boot is preferably involuted to form an inwardly folded extension 29 which slips over the sleeve 23. This configuration holds the window and sleeve in position at the distal end of the waveguide 18. The air gap therefore extends forwardly between this inwardly folded extension 29 and the base portion 26 of the boot so that the air gap thermally isolates the entire length of the waveguide in the probe from thermal influences outside the boot.

In considering the amount of thermal isolation required for the probe, at least three situations would typically be considered: 1) the patient could be hot relative to the temperature of the probe; 2) the patient could be cold relative to the temperature of the probe; and 3) the protective probe cover placed over the probe for hygienic and protective reasons could be either hot or cold relative to the probe temperature.

In addition to the above three situations, two other factors are normally considered when determining the dimension of the air gap: 1) the amount of time the detector takes to complete its temperature measurement; and 2) the typical amount of time that the instrument operator will leave the probe in contact with the patient while taking the patient's temperature.

In an embodiment of the invention, an air gap formed between the heat sink 20 and the inside surface of the outer boot 24 within the range 0.51 to 1.52 mm (0.020 to 0.060 in.) was found to be very effective in isolating the optical path in the probe from external temperature influences encountered in normal use. Thus the combination of a heat sink with high thermal diffusivity, high thermal conductivity, sufficient thermal mass for high heat capacity and a closed air space having low thermal diffusivity and conductivity results in relative thermal isolation. The heat sink and air gap thermally isolate the infrared optical path in the probe portion of the thermometer from extraneous thermal changes. Additionally, the combination of the two provide enough thermal protection such that a measurement may be completed prior to thermal influences reaching the waveguide.

While several particular forms of the invention have been illustrated and described, it will be apparent that various modifications can be made without departing from the spirit and scope of the invention. Accordingly, it is not intended that the invention be limited, except as by the appended claims.

What is claimed is:

1. A hand-held biomedical apparatus adapted to communicate electromagnetic energy to an electromagnetic energy detector, the apparatus comprising:

a probe having an outer surface, a first optical opening adapted for facing the electromagnetic energy to be communicated, a second optical opening adapted for facing the electromagnetic energy detector, said first optical opening and said second optical opening defining an optical path;

a waveguide disposed in the optical path and extending between the first and second optical openings;

heat sink means for providing a heat sink in thermal contact with the waveguide;

air insulation means for providing a closed layer of air insulation between the outer surface of the probe and the waveguide along the entire length of the waveguide in the probe wherein the air insulation means comprises a removable outer boot disposed around the heat sink means, the outer boot having an inside surface separated from the heat sink means, the air insulation means providing the closed layer of insulating air between the heat sink means and the inside surface of the outer boot; and said outer boot comprises a distal end having a distal tip portion which is involuted, the air insulation means providing a portion of the closed layer of air insulation within the involution.

2. The apparatus of claim 1 wherein the heat sink means is formed of a material having a relatively high thermal diffusivity and a relatively high thermal conductivity.

3. The apparatus of claim 1 further comprising a removable window formed of a brittle material which is substantially transparent to said electromagnetic energy, and mounting means for mounting and aligning the removable window in a position adjacent the first optical opening and for maintaining the removable window in said position when the boot is removed, wherein the removable outer boot includes a window retainer at its distal end that holds the window in said position adjacent said first optical opening such that the window is secured firmly in said position adjacent the first optical opening until the boot is removed at which time the window may be removed.

4. The apparatus of claim 3 wherein the mounting means comprises a removable sleeve, said window adapted to fit within the sleeve, wherein the window retainer of the removable outer boot is also shaped to retain said sleeve at said first optical opening; and said sleeve and window being removable after the boot has been removed from the probe.

5. The apparatus of claim 4 wherein:

the removable sleeve comprises a flange;

the heat sink comprises an inset portion which slidably receives the flange of the sleeve; and the window retainer contacts the flange of the sleeve to hold the window in said position adjacent the first optical opening when the boot is in said position and the sleeve and window are slidably removable from the heat sink when the boot is removed from the probe.

6. The apparatus of claim 3 wherein the window retainer comprises the involution of the boot, the involution being shaped to firmly secure the window in said position adjacent the first optical opening until the boot is removed at which time the window may be removed.

7. The apparatus of claim 1 wherein the outer boot is formed of a durable material; and the involution of the removable outer boot extends distally beyond the window.

8. A biomedical apparatus for communicating electromagnetic energy from a patient to a first position, the apparatus comprising:

a probe having an outer surface and first and second optical openings and a waveguide extending between the first and second optical openings, the first optical opening adapted to face the patient and the second optical opening facing the first position;

heat sink means for providing a heat sink in thermal contact with the waveguide of the probe for maintaining a uniform temperature along the waveguide;

air insulation means for providing a closed layer of air between the heat sink and the outer surface of the probe along the entire length of the waveguide in the probe, the air insulation means comprises an outer boot disposed around the heat sink, the outer boot having an inside surface separated from the heat sink, the air insulation means providing the closed layer of insulating air between the heat sink and the inside surface of the outer boot; and wherein said boot comprises a distal tip portion which is involuted, the air insulation means for providing a portion of the closed layer of air insulation within the involution.

9. A biomedical apparatus adapted to communicate infrared energy from a patient to an infrared detector, the apparatus comprising:

a probe having an outer surface and first and second openings and a waveguide extending between the first and second openings, the first opening adapted for facing the patient and the second opening adapted for facing the infrared detector, the probe further comprising a removable outer boot surrounding the waveguide, the outer boot having an outer surface and having an aperture through which the infrared energy from the patient may pass;

a heat sink in thermal contact with the waveguide for maintaining uniform temperature along the waveguide, the heat sink comprising a material having a relatively high thermal diffusivity and a relatively high thermal conductivity;

a closed air space located between the heat sink and an inside surface of the outer boot and extending along the entire length of the waveguide;

a removable window formed of a brittle material which is substantially transparent to said infrared energy; and mounting means for mounting and aligning the removable window in a position adjacent the first opening and for maintaining the replaceable removable window in said position when the outer boot is removed, wherein the removable outer boot includes a window retainer for securing the removable window at a position internal to the boot between the aperture of the removable boot and said first opening at the position aligned and adjacent the first opening such that removal of the window is prevented by the boot until the boot is removed.

10. The apparatus of claim 9 wherein the infrared detector requires a predetermined period of time within which to detect the infrared energy, the heat sink having a heat capacity selected to prevent external temperature changes from reaching the waveguide during the predetermined period of time.

11. The apparatus of claim 9 wherein the infrared detector requires a predetermined period of time within which to detect the infrared energy, the closed air space comprising insulation means for insulating the outer surface of the boot from temperature changes of the heat sink during the predetermined time period.

12. The apparatus of claim 1 wherein the infrared detector requires a predetermined period of time within which to detect the infrared energy, the closed air space comprising insulation means for insulating the waveguide from external temperature changes during the predetermined period of time.

13. The apparatus of claim 9 wherein the mounting means comprises:

a removable sleeve;

wherein said window is adapted to fit within the sleeve and the window retainer is shaped to retain said sleeve at said first optical opening;

wherein the sleeve comprises a flange;

the heat sink comprises an inset portion for slidably receiving the flange of the sleeve; and the retainer of the outer boot is shaped to contact the flange of the sleeve to hold the window in place at the first optical opening when the boot is in place and the sleeve and window are slidably removable from the heat sink when the boot is removed from the probe.

14. The apparatus of claim 9 wherein the outer boot is formed of a durable material; and the removable outer boot extends distally beyond the window.

15. The apparatus of claim 9 wherein the mounting means has an outer surface and the removable boot has an outer surface for receiving a probe cover and an inner surface for mounting to the outer surface of the mounting means.

16. A biomedical apparatus adapted to receive infrared energy from a patient and communicate the infrared energy to an infrared detector, the apparatus comprising:

a probe having an outer surface and first and second openings and a waveguide extending between the first and second openings, the first opening adapted for facing the patient and the second opening adapted for facing the detector, the probe comprising an outer boot forming the outer surface of the probe;

a heat sink in thermal contact with the waveguide for maintaining uniform temperature along the waveguide, the heat sink comprising a material having a relatively high thermal diffusivity and a relatively high thermal conductivity;

a closed air space located between the heat sink and the outer boot and extending along the entire length of the waveguide;

the outer boot having an inside surface separated from the heat sink, the closed air space being located between the heat sink and the inside surface of the boot; and wherein said boot comprises a distal tip portion which is involuted, the involution containing an air space continuous with the air space between the heat sink and the inside surface of the boot.

17. A probe having replaceable elements adapted to communicate electromagnetic energy from a patient to an electromagnetic energy detector positioned outside the probe, the probe comprising:

an electromagnetic energy conducting member having first and second openings with an electromagnetic energy conducting passage extending between the openings, the first opening adapted to face the patient and the second opening adapted to face the electromagnetic energy detector;

a replaceable window formed of a brittle material that is substantially transparent to said energy, the window being removably mounted over the first opening of the electromagnetic energy conducting member;

a mounting means for mounting and aligning the replaceable window in a position adjacent the first opening; and an outer boot removably positioned over the electromagnetic energy conducting member and comprising a window retainer for engaging a mounting surface of the mounting means to secure the removable window in said position adjacent the first opening while the boot is mounted on the electromagnetic energy conducting member, the mounting means maintaining the window in said position when the outer boot is removed, wherein removal of the outer boot from the electromagnetic energy conducting member permits removal of the window from the first opening.

18. The probe of claim 17 wherein the outer boot is formed of a durable material; and the outer boot further comprises a distal tip portion which extends distally beyond the window.

19. The probe of claim 17 wherein the mounting means comprises:

a removable sleeve having an opening within which the window is mounted;

wherein the window retainer of the removable boot is shaped to contact the sleeve and retain the sleeve at a position in relation to the electromagnetic energy conducting member such that the window is positioned adjacent the first opening while the boot is mounted over the electromagnetic energy conducting member and the sleeve and window are removable from the electromagnetic energy conducting member after the boot has been removed therefrom.

20. The probe of claim 19 wherein:

the sleeve comprises a mounting flange;

the electromagnetic energy conducting member comprises a second mounting surface on which the sleeve is slidably mounted and an inset portion for receiving the flange of the sleeve;

the window retainer of the outer boot is shaped to contact the flange of the sleeve to secure the sleeve on the second mounting surface such that the window is positioned adjacent the first opening when the boot is in place, and the sleeve and window are slidably removable from the electromagnetic energy conducting member and can be replaced when the boot is removed from the probe.

21. A probe having replaceable elements adapted to communicate electromagnetic energy from a patient to an electromagnetic energy detector positioned outside the probe, the probe comprising:

an electromagnetic energy conducting member having first and second openings with an electromagnetic energy conducting passage extending between the openings, the first opening adapted to face the patient and the second opening adapted to face the electromagnetic energy detector;

a replaceable window that is substantially transparent to said electromagnetic energy, the replaceable window being removably mounted over the first opening of the electromagnetic energy conducting member;

a mounting device for mounting and aligning the replaceable window in a position adjacent the first opening; and an outer boot removably positioned over the electromagnetic energy conducting member and comprising a window retainer for engaging a mounting surface of the mounting device to secure the removable window in said position adjacent the first opening while the boot is mounted on the electromagnetic energy conducting member, the mounting device maintaining the window in said position when the outer boot is removed, wherein removal of the outer boot from the electromagnetic energy conducting member permits removal of the window from the first opening.

22. The probe of claim 21 wherein the outer boot is formed of a durable material; and the outer boot further comprises a distal tip portion which extends distally beyond the window.

23. The probe of claim 21 wherein the mounting device comprises:

a removable sleeve having an opening within which the window is mounted;

wherein the window retainer of the removable boot is shaped to contact the sleeve and retain the sleeve at a position in relation to the electromagnetic energy conducting member such that the window is positioned adjacent the first opening while the boot is mounted over the electromagnetic energy conducting member and the sleeve and window are removable from the electromagnetic energy conducting member after the boot has been removed therefrom.

24. The probe of claim 23 wherein:

the sleeve comprises a mounting flange;

the electromagnetic energy conducting member comprises a second mounting surface on which the sleeve is slidably mounted and an inset portion for receiving the flange of the sleeve; and the window retainer of the outer boot is shaped to contact the flange of the sleeve to secure the sleeve on the second mounting surface such that the window is positioned adjacent the first opening when the boot is in place, and the sleeve and window are slidably removable from the electromagnetic energy conducting member and can be replaced when the boot is removed from the probe.

25. The probe of claim 21, wherein the outer boot comprises a distal end having a distal tip portion which is involuted.

26. The probe of claim 21, wherein the outer boot has an inside surface separated from the electromagnetic energy conducting member and defining a closed layer of insulating air between the electromagnetic energy conducting member and the outer boot.

27. The probe of claim 26, wherein the closed layer of insulating air extends along the entire length of the electromagnetic energy conducting passage.

28. A method of communicating electromagnetic energy from a patient to a first position, the method comprising the steps of:

receiving the electromagnetic energy from the patient with a probe having an outer surface, a first optical opening adapted for receiving the electromagnetic energy from the patient, a second optical opening adapted for facing the first position, the first and second optical openings defining an optical path;

disposing a waveguide in the optical path extending between the first and second optical openings, said disposing step further comprising the step of forming the waveguide in a heat sink;

communicating the received electromagnetic energy through the probe to the first position with the waveguide;

maintaining a uniform temperature along the waveguide;

insulating the waveguide along its entire length with a closed air space by mounting an outer removable boot over the waveguide and heat sink, said outer boot having an inside surface that is separated from the heat sink to establish the closed air space between the outer boot and the heat sink;

mounting a removable window formed of a brittle material which is substantially transparent to said received energy and which is separate and removable from the removable boot, at a position internal to the outer boot and adjacent said first optical opening and held in place adjacent said first optical opening by the outer boot such that when the boot is removed, the window may be separately removed and replaced.

29. The method of claim 28 wherein the step of mounting an outer removable boot over the waveguide and heat sink further comprises the steps of forming the outer boot from a durable material and forming the tip of the boot to extend distally beyond the window.

30. A method of communicating electromagnetic energy from a patient to a first position, the method comprising the steps of:

applying a probe to the patient, the probe having an outer surface, a first optical opening facing the electromagnetic energy, and a second optical opening facing a first position, said first optical opening and said second optical opening defining an optical path, said first optical opening receiving the electromagnetic energy from the patient;

disposing a waveguide in the optical path further comprising the step of forming the waveguide in a heat sink;

communicating the received electromagnetic energy through the probe to the first position with the waveguide;

maintaining a uniform temperature along the waveguide; and insulating the waveguide along its entire length with a closed air space wherein the step of insulating comprises covering the heat sink with an outer boot, said boot having an inside surface, the inside surface being separated from the heat sink to establish the closed air space between the outer boot and the heat sink;

said disposing step further comprising the step of involuting the distal tip portion of the outer boot, the involution including an air space continuous with and forming a part of the closed air space between the outer boot and the heat sink.

* * * * *

UNITED STATES PATENT AND TRADEMARK OFFICE
CERTIFICATE OF CORRECTION

PATENT NO. : 6,332,090 B1  
DATED : December 18, 2001  
INVENTOR(S) : Michael P. DeFrank et al.

It is certified that error appears in the above-identified patent and that said Letters Patent is hereby corrected as shown below:

<u>Column 7,</u>  
Line 5, before "removable", delete "replaceable".  
Line 25, change "1", to read -- 9 --.

Signed and Sealed this

Eleventh Day of June, 2002

Attest:

Attesting Officer

JAMES E. ROGAN  
*Director of the United States Patent and Trademark Office*